United States Patent [19]

LaFetra

[11] Patent Number: 5,197,146
[45] Date of Patent: Mar. 23, 1993

[54] METHOD FOR MAINTAINING CACHE COHERENCE IN A MULTIPROCESSOR COMPUTER SYSTEM

[75] Inventor: Ross V. LaFetra, Cupertino, Calif.

[73] Assignee: Hewlett-Packard Company, Palo Alto, Calif.

[21] Appl. No.: 369,152

[22] Filed: Jun. 21, 1989

[51] Int. Cl.⁵ .................... G06F 12/00; G06F 13/00
[52] U.S. Cl. ............................ 395/425; 395/400;
364/230.4; 364/931.44; 364/942.4
[58] Field of Search ... 364/200 MS File, 900 MS File; 395/400, 425

[56] References Cited

U.S. PATENT DOCUMENTS

| | | | |
|---|---|---|---|
| 4,571,674 | 2/1986 | Hartung | 395/250 |
| 4,713,755 | 12/1987 | Worley, Jr. et al. | 395/5 |
| 4,747,043 | 5/1988 | Rodman | 395/425 |
| 4,843,542 | 6/1989 | Dashiell et al. | 395/425 |
| 4,847,804 | 7/1989 | Shaffer et al. | 395/425 |
| 4,933,835 | 6/1990 | Sachs et al. | 395/425 |
| 5,008,813 | 4/1991 | Crane et al. | 395/425 |
| 5,025,365 | 6/1991 | Mathur et al. | 395/600 |

OTHER PUBLICATIONS

Gustavson et al., "The Scalable Coherent Interface Project (SuperBus)," Rev. 13, No. 1, Aug. 22, 1988, (IEEE direct circulation, David Gustavson, SLAC Bin 88, P.O. Box 4349, Stanford, Calif. 94309).

Primary Examiner—Glenn Gossage
Attorney, Agent, or Firm—Roland I. Griffin; Alan H. Haggard

[57] ABSTRACT

A method is provided for maintaining cache coherence in a multiprocessor computer system having a potential for duplication of data in a plurality of storage location, where there is cache associated with each processor by storing a processor address and a "hint" or for each cache. More specifically, where the multiprocessor computer system employs doubly-linked lists for identifying a previous master of sharable data and a next master of the sharable data, the method includes the steps of passing the current address of the current master from the current master to the previous master; passing the current address of the current master from the current master to the next master; passing the current index of the current master from the current master to the previous master (the current index being a collection of all information needed by the current master to find a coherence block); and passing the current index of the current master from the current master to the next master.

12 Claims, 5 Drawing Sheets

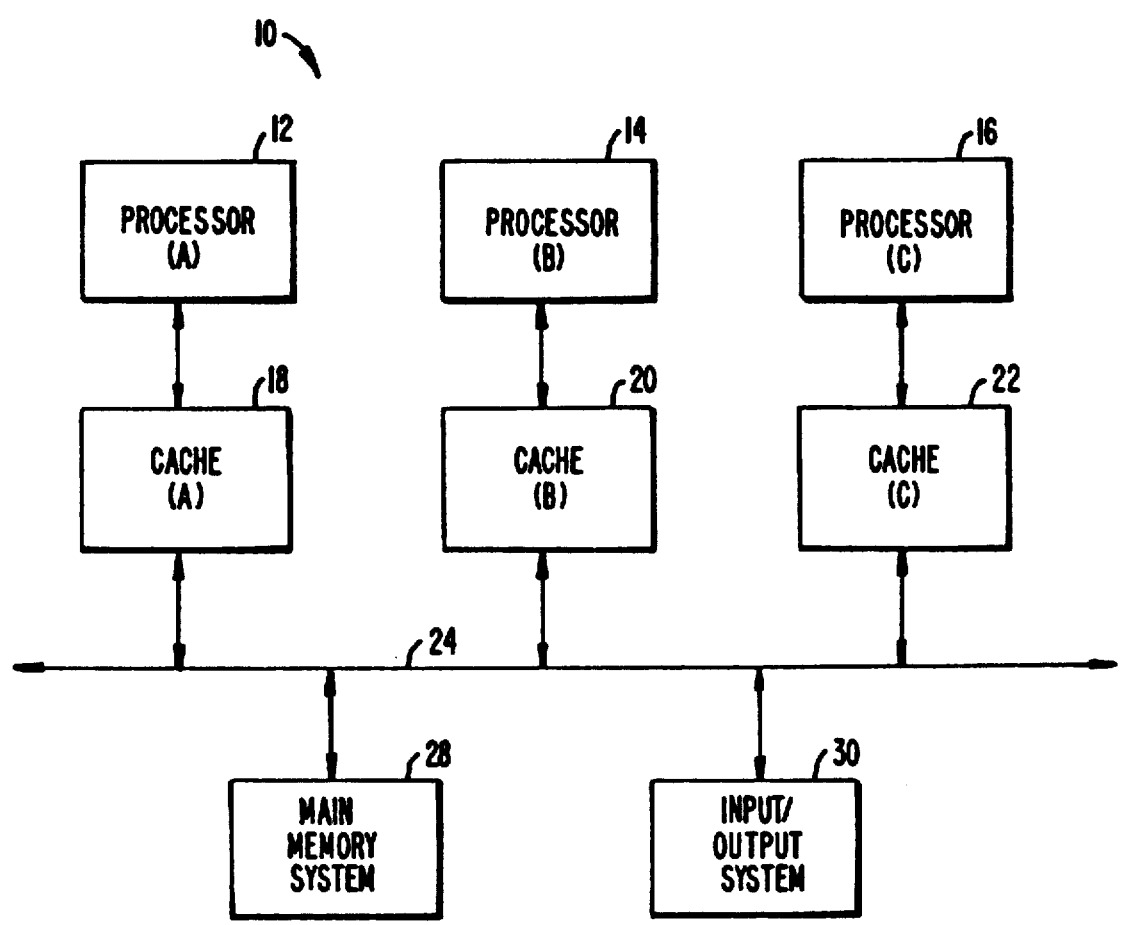
FIG._1.

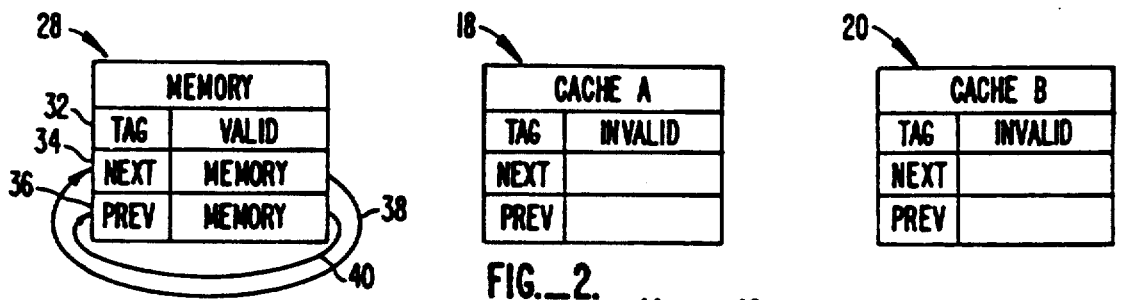
FIG._2.
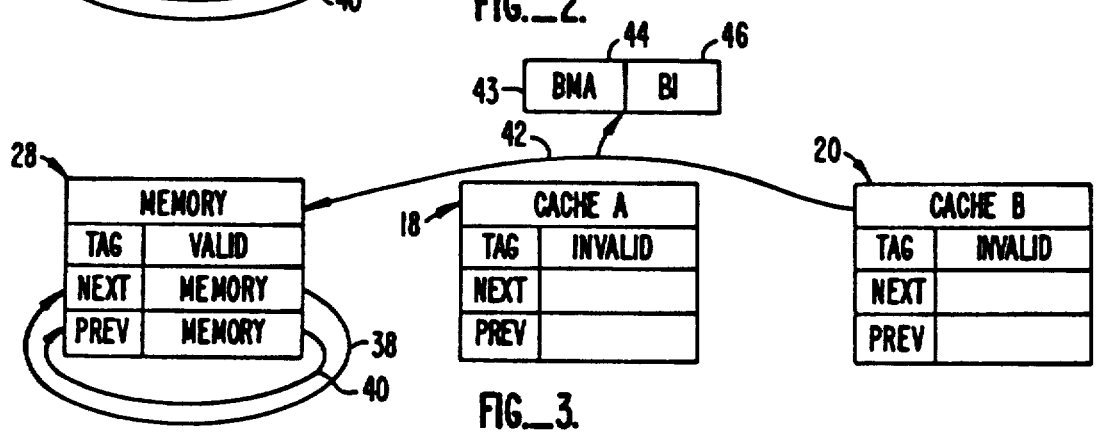
FIG._3.
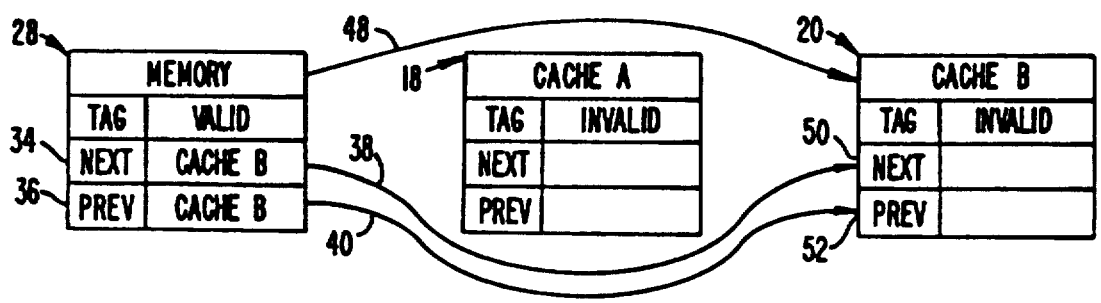
FIG._4.
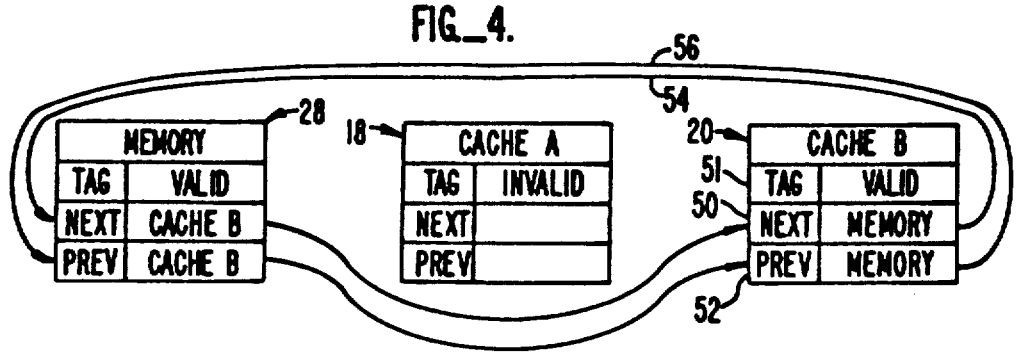
FIG._5.

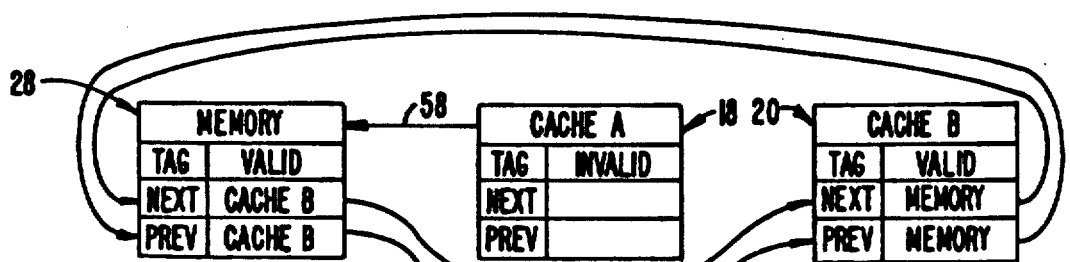
FIG._6.
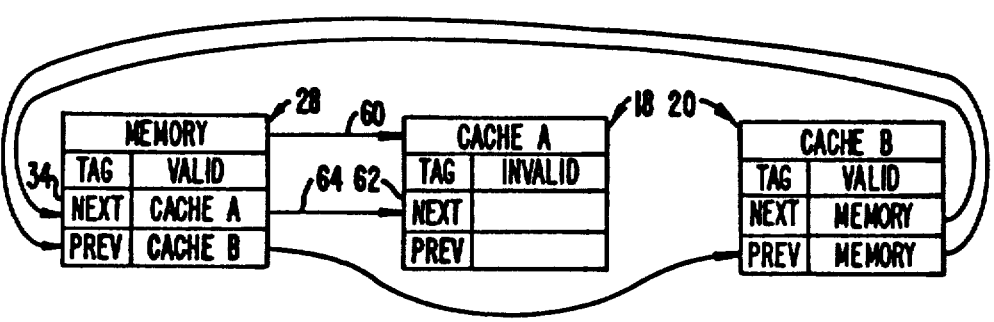
FIG._7.
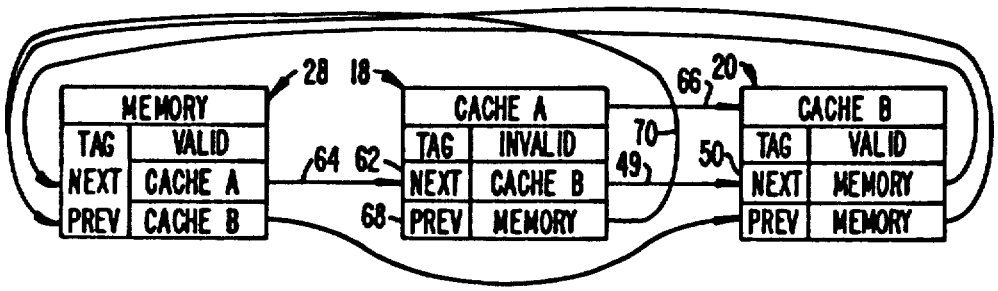
FIG._8.
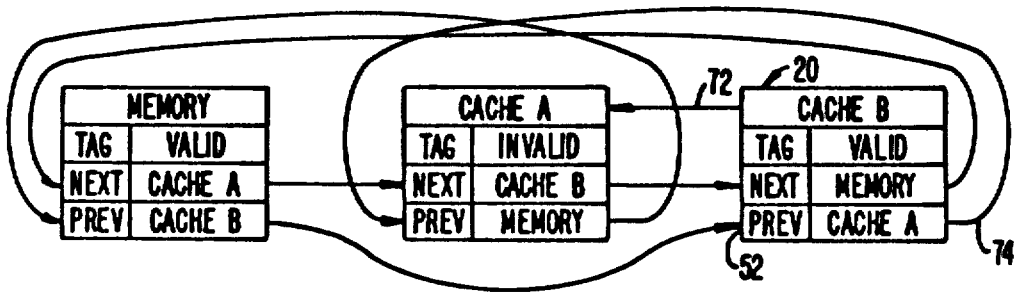
FIG._9.

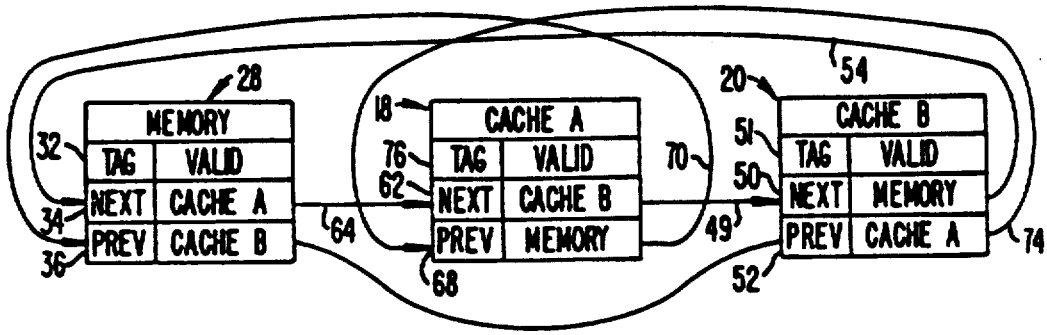
FIG._10.
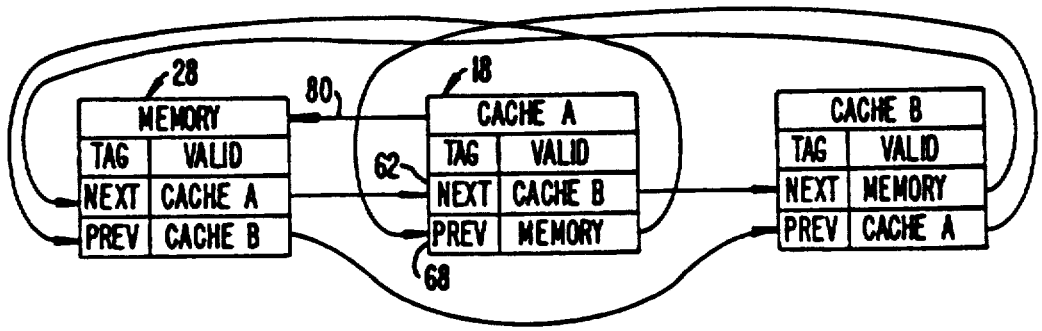
FIG._11.
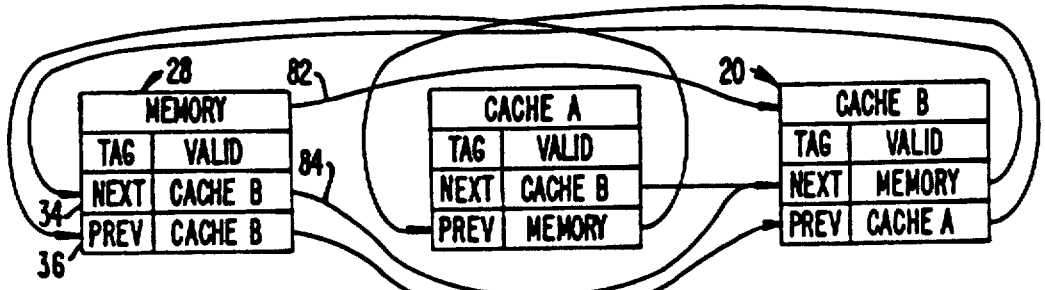
FIG._12.
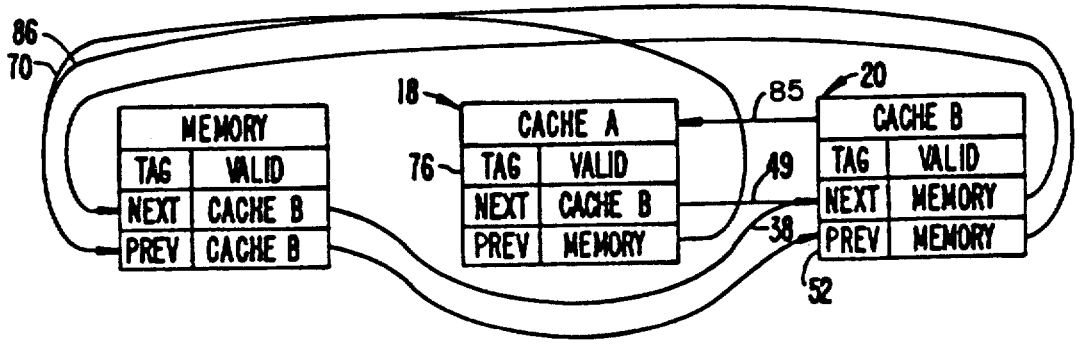
FIG._13.

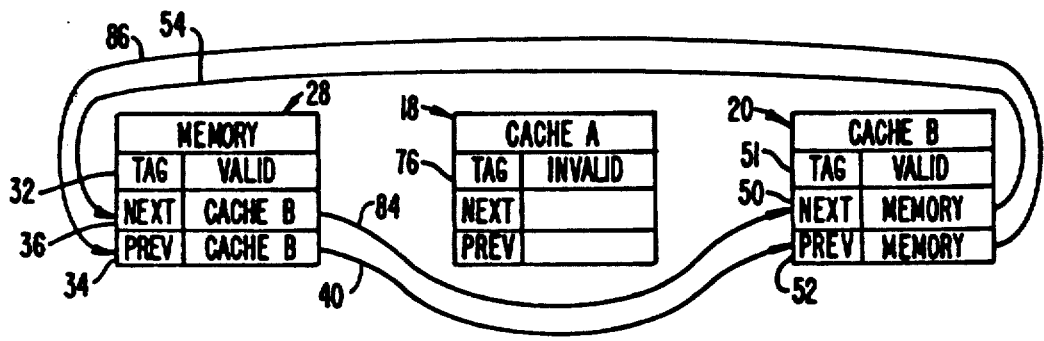
FIG._14.
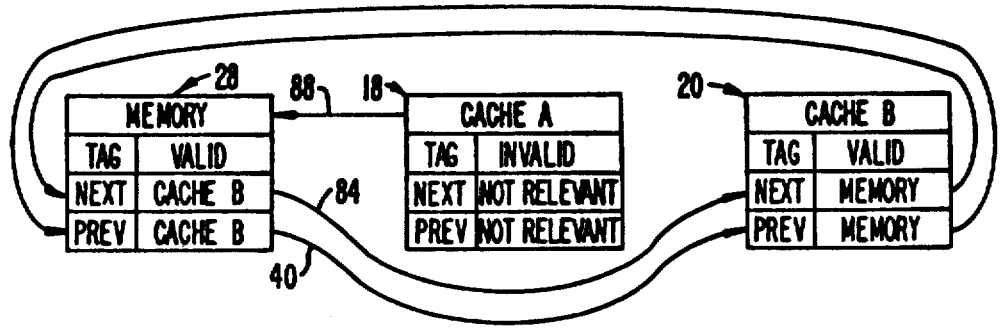
FIG._15.
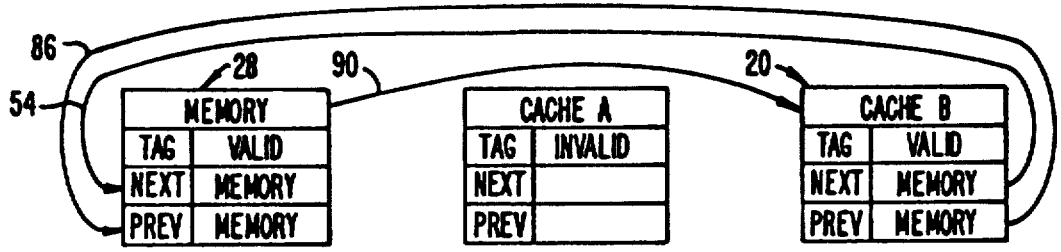
FIG._16.
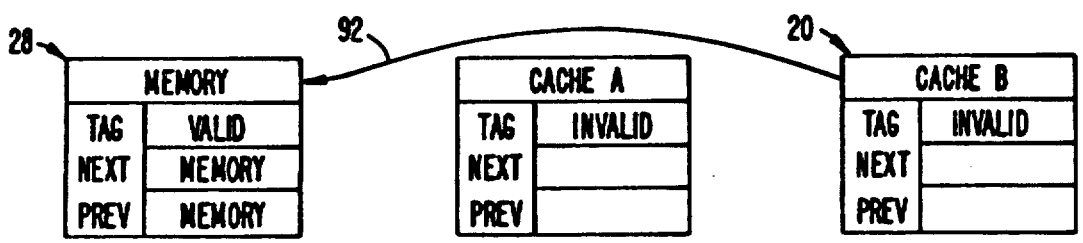
FIG._17.

METHOD FOR MAINTAINING CACHE COHERENCE IN A MULTIPROCESSOR COMPUTER SYSTEM

BACKGROUND OF THE INVENTION

This invention relates to computers and more specifically to intercomputer interfaces wherein caching schemes are employed. In particular the invention relates to cache coherence protocols.

Cache coherence protocols are unidirectional transfer protocols used to achieve the performance advantages of fast local cache memories while maintaining a flat shared-memory model for a plurality of computer processors operating simultaneously. In a cache coherence protocol, system processes must be controlled such that multiple valid copies of the same data never become different, that is, never become incoherent, without communicating the change directly or indirectly to other processors which have a need to access the data.

The time required to transfer data on high-speed computer interfaces, such as multiple-bit buses, is limited by distance, propagation delays, flux (bandwidth), noise and signal distortion. Both asynchronous and synchronous interfaces have distinctive limitations. The speeds of synchronous buses are limited for example by the propagation delay associated with the handshaking required for each self-contained unit of data. The speeds of synchronous buses are limited by time differences between clock signals and data signals originating at different sources. A traditional bus becomes a bottleneck in a multiprocessor system when many processors need more cumulative bandwidth than is available on the bus.

One approach addressing the fundamental limitations on data flow is the use of packetized unidirectional signalling schemes and distributed cache protocols. These schemes help to reduce bus traffic while providing the high speed processors rapid access to much of the memory space. There is nevertheless an overhead penalty in terms of complexity associated with the controlling protocols.

In some cache coherency schemes there is support for virtual-physical caches, such as those commonly employed in Hewlett-Packard Precision Architecture (HPPA) machines (HP/9000 Series 800 and HP/3000 Series 900). However, such support frequently requires that all caches be homogeneous, that is, they must be of the same depth and have the same indexing mechanism. Certain limited non-homogeneous caching schemes can be accommodated by prior planning. The obvious way to handle generalized nonhomogeneous caches is to pass the entire virtual address as a "cache hint" on or "virtual hint." A virtual hint is some information about the virtual address which can help in finding the tag. However, passing the entire virtual address is costly in terms of time and bandwidth utilization.

What is needed is a method for passing a cache hint while avoiding having to pass the entire virtual address wherein each master on the bus has no need to know how other resources on a bus index their caches.

Cache consistency control is known. A recent patent, U.S. Pat. No. 4,713,755, issued Dec. 15, 1987, to Worely et al., describes one approach for maintaining memory integrity in a system having hierarchical memory by use of explicit software control of caches. The technique therein employs status flags for each block of stored information indicative of valid data and contaminated data. The status flags are employed by the operating system of an individual processor to initiate corrective action to cure the contaminated data.

An IEEE study group project has been proposed by representatives of the computer industry to develop a scalable coherent interface standard for high performance multiprocessor environments. (Gustavson et al , "The Scalable Coherent Interface Project (SuperBus)," Rev. 13, No. 1, Aug. 22, 1988, (IEEE direct circulation, David Gustavson, SLAC Bin 88, P.O. Box 4349, Stanford, Calif. 94309). The approach being proposed is a directory-based coherence mechanism whereby cache controllers and memory cooperate. One of the features of the proposed scheme is the use of a doubly-linked list scheme to support a directory-based cache coherency mechanism. If virtually-indexed caches are employed in the above scheme, it is necessary to have a mechanism to know where the index is to find the tag. However, with such a tag, a check can be made of the bus to determine if there is a coherency hit, that is, a potential conflict with another requestor of data.

In the environment of interest, the bus shared by the processors carries the physical address of the tag and sometimes "virtual hints". Virtual hints have the limitation that they tend to be processor specific.

As the present invention is based on use of a doubly-linked list directory cache coherency scheme, it is believed helpful to provide here a brief description of the operation of such a scheme.

Directory-based cache coherency techniques involve the use of tagged memory, that is, the use of memory tags which indicate which masters contain copies of the data of interest. A master may be any contiguous memory unit, processor cache or bus converter having a need for data. The tags typically are storable values containing information about the status of data. Such information may include whether the data is owned by a remote master as shared (nonexclusive) or private (exclusive) data. A mechanism is also needed to indicate which masters have a copy of the data of interest. One technique, based on the singly-linked list, is to store the master's address of the first such master to have a copy. (The master's address is an address to which a master will respond.) The singly-linked list is distributed among all masters so that each master has one link per valid cache coherence block in the master's cache. A doubly-linked list is formed by adding another link or master's address which aids in the removal of entries from the list. The list is two directional, and the two links are called the nextmaster link and the previousmaster link. The object of the use of the linked list is to prevent corruption of data stored in duplicated contiguous units of sharable information called coherence blocks. A coherence block is that unit of information specified as having to remain internally coherent. It is not necessarily the unit of transferable information.

In a first operation, called a sharable request, a master, such as a cache, requests a sharable copy of a portion of a coherence block, the main memory first checks its tags to determine if any master has a private copy of the requested coherence block. If yes, then the memory attends to removing the private copy before proceeding. If either no copy exists or only a shared copy exists, the memory saves the master's address of the requesting master as the nextmaster link and returns its old nextmaster link to the requesting master so that it can be stored as the nextmaster link there in its directory. The requesting master then also sets its nextmaster link to the value indicating memory. Either a special null master address or the memory's master address can be used to mark each end of the list. A list is thus built whereby all copies of a coherency block can be traced by "patching" of addresses forward through the nextmaster links and by "patching" of addresses backward through the previousmaster links.

In another operation, called a private request, a master requests a private copy of a coherence block. The process is the same as a sharable request, except that the memory must remove any copies then outstanding prior to proceeding.

In another operation, called a shared copy removal, a master removes a shared copy of a coherence block which causes a transaction to be issued to inform the previous master of a new nextmaster link. Thereafter, the next master must also be informed and acknowledgment of completion of both operations must also be received before the master can really forget about the coherence block.

In another operation, called a coherence block forget, the memory instructs all caches to forget about a coherence block by issuing a transaction which walks down the nextmaster links of each cache until the end of the list is found, which points back to the memory. The memory is thereby informed that no cache has retained a copy of the coherency block.

What remains to be solved is how to inform all next and previous masters in such a manner that the current master can actually forget about a line.

SUMMARY OF THE INVENTION

According to the invention, a method is provided for maintaining cache coherence in a multiprocessor computer system having a potential for duplication of data in a plurality of storage locations, where there is cache associated with each processor, by storing a processor address and a "hint" or for each cache. More specifically, where the multiprocessor computer system employs doubly-linked lists for identifying a previous master of the sharable data and a next master of the sharable data, the method includes the steps of: 1) passing the current address of the current master from the current master to the previous master; 2) passing the current address of the current master from the current master to the next master; 3) passing the current index of the current master from the current master to the previous master (the current index being a collection of all information needed by the current master to find a coherence block); and 4) passing the current index of the current master from the current master to the next master.

This technique and its variations allow the general mixing of processors on a complex network-like-bus while still maintaining cache coherence across all processors on the bus. The use of the doubly linked list prevents the cache coherence protocol from issuing a broadcast transaction, which makes implementation of the network-like bus much easier than heretofore.

Within the general technique, it is allowable to even mix cache indexing schemes within the cache coherency protocol. While the enhancements to the cache coherency protocol according to the invention are limited by the number of available special index bits, the invention is not limited in the manner of use of the indexing bits. Thus, schemes may be mixed.

The invention will be better understood upon reference to the following detailed description in connection with the following drawings.

BRIEF DESCRIPTION OF THE DRAWINGS

FIG. 1 is a block diagram of a portion of a multiprocessor computer system in which a software operating system may employ the method according to the invention.

FIG. 2 is a schematic diagram illustrating a first state of a common memory, a first cache and a second cache.

FIG. 3 is a schematic diagram illustrating a second state of the common memory, the first cache and the second cache.

FIG. 4 is a schematic diagram illustrating a third state of the common memory, the first cache and the second cache.

FIG. 5 is a schematic diagram illustrating a fourth state of the common memory, the first cache and the second cache.

FIG. 6 is a schematic diagram illustrating a fifth state of the common memory, the first cache and the second cache.

FIG. 7 is a schematic diagram illustrating a sixth state of the common memory, the first cache and the second cache.

FIG. 8 is a schematic diagram illustrating a seventh state of the common memory, the first cache and the second cache.

FIG. 9 is a schematic diagram illustrating a eighth state of the common memory, the first cache and the second cache.

FIG. 10 is a schematic diagram illustrating a ninth state of the common memory, the first cache and the second cache.

FIG. 11 is a schematic diagram illustrating a tenth state of the common memory, the first cache and the second cache.

FIG. 12 is a schematic diagram illustrating an eleventh state of the common memory, the first cache and the second cache.

FIG. 13 is a schematic diagram illustrating a twelfth state of the common memory, the first cache and the second cache.

FIG. 14 is a schematic diagram illustrating a thirteenth state of the common memory, the first cache and the second cache.

FIG. 15 is a schematic diagram illustrating a fourteenth state of the common memory, the first cache and the second cache.

FIG. 16 is a schematic diagram illustrating an fifteenth state of the common memory, the first cache and the second cache.

FIG. 17 is a schematic diagram illustrating a sixteenth state of the common memory, the first cache and the second cache.

DESCRIPTION OF SPECIFIC EMBODIMENTS

Referring to FIG. 1, there is shown a segment of a bus-based multiprocessor system 10 comprising a plurality of processors 12, 14, 16 and a plurality of high-speed cache memory systems, herein cache 18, cache 20, and cache 22, respectively, a memory bus 24, a main memory system 26 and an input/output system 30. Each processor 12, 14, 16 is coupled to and controls a respective cache 18, 20, 22. The caches 18, 20, 22 are coupled via the memory bus 24 to the main memory system 28. As is known in the art, each of the individual systems, including the memory and each of the caches, is provided with independent management and control functionality. For the purposes of illustration of this invention, each of the caches 18, 20, 22 (with the associated processor) and the main memory system 28 may serve as masters in a doubly-linked list cache coherency scheme.

As used generally, a master is a subsystem unit asserting control over information. Because the master/slave relationship changes quickly within the context of a single transaction in the present invention, the traditional position of master and slave is not easily tracked. There are in fact many masters. Hence, reference will generally be made to many masters and to specific elements as masters, and the master/slave relationship will be understood by context.

The indexing scheme of each cache and the memory in a doubly-linked protocol scheme in accordance with the invention is master specific. In accordance with the invention, only master-specific information in the form of an index value, or simply an "index," along with a master's address is passed, and only the master needing information which is specific to it uses the index information, even though it may be stored physically at another master. A master always knows what is required to process its own information and what information is needed by others to process its own information. Thus, any master can supply to the other masters communicating with it this information. The other masters may store information which is used by the request-receiving process which is never used locally.

FIG. 2 illustrates the state and linkage of portions of links of three different potential masters, namely, main memory system 28, first cache 18 and second cache 20. The principles illustrated apply to any number of masters. In the example shown, the state of the masters is shown as it would be immediately after initialization when the data of any and all coherence blocks is stored in memory and no valid data is stored in any cache. Specifically, the directory of each coherence block of data includes a tag slot, such as element 32 of the memory 28, a "next" address and index slot 34, such as element 34 of the memory 28, and a "previous" address and index slot 36, such as element 36 of the memory 28. In addition, pointers are shown, such as a first pointer 38 and a second pointer 40. The tag slot 32 may hold the values of either "valid" or "invalid," indicating whether the data in the coherence block to which it refers is safe to use. The "next," or nextmaster, slot 34 may include as values called a link the address and index of any master including itself. The "previous," or previous master slot 36, may also include as values called a link the address and index of any master including itself. The first pointer 38 and the second pointer 40 each point from one slot to another according to the link. In FIG. 2, two pointers 38 and 40 point back to themselves.

A slot containing a link and illustrated by its related pointer to a next slot may be physically represented according to the invention as an address and an index appended to the address stored in the same slot. Finally, as used herein, transactions, by which data and instructions are passed between masters, are represented as arrows from a first label (e.g., "memory") to a second label (e.g., "cache A"), as will be apparent hereinafter.

The memory 28 always has a valid copy of the data when data is accessible. (Hence the tag in memory is permanently set to the value "valid.") The caches 18 and 20 have valid data only when the tags have been set and otherwise it is assumed that all caches have invalid data.

To illustrate the process of requesting and tagging valid data, reference is made to the Figures beginning with FIG. 3. A request for data transaction 42 is instituted by Cache B 20 acting as a master whereby Cache B requests sharable data from the memory 28. Such a request typically contains a tag as to transaction type and the physical address of the requested coherence block. However, according to the invention, the request also contains Cache B's master address 44 and the index 46 which Cache B needs in order to index into its cache, as represented by a data block 43 as might be found in a temporary buffer associated with data received off the bus 24 (FIG. 1). This two-element block of information is stored in the corresponding slot. The links merely express graphically the connection defined by the contents of the respective slots.

Referring to FIG. 4, memory 28 thereupon issues a second transaction 48 to Cache B 20 whereby the data requested by Cache B 20 is passed to corresponding locations in Cache B along with the nextmaster link for Cache B. The memory 28 will recognize that its own list was previously empty. Therefore, memory 28 places Cache B's link address and index in the nextmaster slot 34 and the previous master slot 36. However, the pointers 38 and 40 now point to nextmaster slot 50 and previousmaster slot 52 of Cache B 20, and the memory link address and index are loaded into those slots (FIG. 5). Cache B 20 recognizes that the nextmaster slot 50 and the previousmaster slot 52 now contain links which point to memory 28, as indicated by pointers 54 and 56. Cache B 20 then recognizes that its request has been completed. The final state, with the tag 51 of Cache B 20 set to the value valid, is shown in FIG. 5. At the conclusion of the transactions in each instance, according to the invention, the link indexes of the previousmaster and the nextmaster as well as the link addresses are stored in the respective nextmaster slot and the previousmaster slot of the requesting master.

FIG. 6 illustrates a first transaction in a further transaction set according to the invention which might follow the previous sequence of transactions. Cache A issues a request 58 to memory 28 for a sharable copy of the same coherency block previously requested by Cache B 20 (FIG. 3). In FIG. 7, memory 28 sends back the requested cache data (path 60) and forwards its nextmaster link index and address stored in nextmaster slot 34 to next master slot 62 as represented by link 64. The link value in slot 34 is thus replaced by the value Cache A. In FIG. 8, it is seen that Cache A 18 stores memory's old nextmaster link value of Cache B in nextmaster slot 62, thereby linking nextmaster slot 62 to nextmaster slot 50, as indicated by pointer 49. Cache A 18 also sends a transaction 66 to Cache B 20 to advise it that there is a new previousmaster. Cache A 18 has loaded its previousmaster slot 68 with the link index and address of the memory 28, as indicated by link 70. Cache A 20 knows that the previousmaster link value is memory because the transaction 60 was issued by the memory 28.

In the next sequence, shown in FIG. 9, Cache B 20 issues an acknowledgment 72 to Cache A 18 and updates its previousmaster link value stored in previousmaster slot 52 as indicated by link 74. Cache B 20 knows the previousmaster slot value is Cache A because Cache A 18 initiated the transaction.

In FIG. 10, the final state is illustrated. All links are now completed, and the value of the tag 76 of Cache A 18 has been set to valid. Cache A 18 and its associated processor can thereupon employ all the content of the coherence block without risk of use of invalid data.

FIG. 11 begins a sequence illustrating removal of a coherence block from a cache, in this example, Cache A. Cache A institutes a transaction 80 to its previous master, namely, memory 28, as indicated by its previousmaster value in slot 68. Cache A thereby passes the index and address of a new nextmaster link, which is the value Cache B stored in its nextmaster slot 62. Cache A's previousmaster slot 68 is used to get its previous master's index and address, which value is also passed in the transaction 80 to memory. In this case, the previousmaster slot value is memory.

In FIG. 12, Cache A's previous master (memory 28) sends a transaction 82 to its new next master (Cache B 20, as indicated by the value in slot 34 with link 84), in order to fix Cache B's previousmaster link. In other words, the transaction 82 is to fix Cache A's nextmaster's previousmaster link.

In FIG. 13, Cache B 20 issues a transaction 85 to Cache A 18 in order to inform Cache A 18 that the operation is complete. The previousmaster slot 52 has been set to the value memory as indicated by pointer 86. Bad pointers 38, 49 and 70, 86 are corrected by removal of Cache A 18, indicated by setting the value of its tag 76 to invalid. FIG. 14 shows this final state after completion of the transaction sequence.

A frequent type of transaction is a flush or purge of a coherence block initiated by a cache which is not in the list. Referring to FIG. 15, Cache A 18 issues a transaction 88 to memory 28 requesting such a purge from all caches. Memory 28 receives the transaction 88 and notes from its link list that other copies of the coherence block exists.

Thereupon, memory 28 issues a transaction 90 to start the flush/purge operation (FIG. 16). The transaction 90 is directed along its nextmaster link indicated by pointer 84 (FIG. 15) to Cache B and removes its own nextmaster link value indicated by pointer 84 and previousmaster link value indicated by pointer 40.

In FIG. 17, cache B 20, which is the subject next master and previous master, receives the transaction 90 and forwards the purge request to memory 28 via transaction 92 based on its nextmaster link, after it removes its own previousmaster link as indicated by pointer 86 and nextmaster link as indicated by pointer 54 (FIG. 16). Cache B 20 sets its tag to the value invalid. Once memory 28 has received the forwarded flush/purge request, it can mark the original request complete.

The above examples are merely a sampling of the type of transactions which can be carried out with reliability in a multiprocessor environment employing doubly-linked list cache coherency protocols modified in accordance with the invention. Another example is a request for a private coherence block, namely, a cache coherence block which is not to be shared with other caches. The request is similar to that for a shared coherence block with the following exception: Memory 28 must issue and complete a flush operation prior to returning data to the requesting master.

This invention, particularly the indexing and the passing of indexes, allows general mixing of processors, each employing its own indexing scheme, on a complex network-like bus while maintaining cache coherence across all processors. This invention becomes acutely important in large multiprocessor bus networks. It is unnecessary to issue broadcast transactions, which are difficult to recover from if cache coherency is a concern. The size of the bus network is limited only by the number of index bits. The nature of the use of the index is not affected by the cache in which it is stored.

The invention has now been explained with reference to specific embodiments. Other embodiments will be apparent to those of ordinary skill in the art. For example, while the method disclosed is described in connection with only a single central memory, a system could comprise multiple memories having a valid copy of elements of the subject data without departing from the spirit and scope of this invention. It is therefore not intended that the invention be limited, except as indicated by the appended claims.

I claim:

1. A method for maintaining cache coherence in a multiprocessor computer system having a potential for duplication of data in a plurality of storage locations identifiable as coherence blocks, said multiprocessor computer system employing double-linked lists for identifying a previous master of said data and a next master of said data, said method comprising the steps of:

passing a current address of a current master from the current master to the previous master, wherein the current address is the location to which the current master will respond;

passing the current address of the current master from the current master to the next master;

passing a current index of the current master from the current master to the previous master, wherein the current index is a collection of information needed by the current master to use one of the coherence blocks; and passing the current index of the current master from the current master to the next master.

2. The method according to claim 1 wherein the current address and the current index are passed simultaneously as part of a transaction.

3. The method according to claim 1 wherein said plurality of storage locations include one central memory system for containing a valid copy of all data and at least two cache memories, each one of said cache memories being coupled to its own associated processor.

4. The method according to claim 3 wherein each cache memory stores at least a portion of said coherence blocks, each of the coherence blocks having associated therewith a first tag indicative of the presence of valid data or invalid data, and wherein each cache memory includes a slot for storing said current address and the current index of the previous master, and a slot for storing said current address and the current index of the next master.

5. A method for maintaining cache coherence in a multiprocessor computer system having a potential for duplication of data in a plurality of storage locations identifiable as coherence blocks, said multiprocessor computer system employing doubly-linked lists for identifying a previous master of said data and a next master of said data, said method comprising the steps of:

a) issuing from a first master to a second master a first transaction requesting sharable data in a coherence block of said second master, said second master being a repository of known valid data, said first transaction including at least an address of a requested coherence block, a first master address for said first master and a first index which identifies a storage location within the first master;

b) storing a second master address of said second master and a second index of said second master in a previous master storage location of said first master, thereby to indicate a previous link of said first master; thereafter c) issuing from said second master to said first master a second transaction containing at least a portion of the sharable data and at least a third master address and a third index of a third master from a next master storage location of said second mater; thereafter d) storing said first master address and said first index in said next master storage location of said second master, thereby to indicate a next link of said second master;

e) storing said third master address and said third index in a next master storage location of said first master, thereby to indicate a next link of said first master; thereafter f) issuing from said first master to said third master a third transaction containing said first master address and said first index;

g) storing said first master address and said first index in a previous master storage location of said third master thereby to indicate a previous link of said third master; and h) updating previous master addresses and indexes and next master addresses and indexes in selected linked masters.

6. The method according to claim 5 further inducing the step of tagging each master as containing valid data upon completion of said updating of addresses and indexes.

7. The method of claim 5 wherein said updating step h) includes acknowledging from said third master to said first master completion of the request of said first master for sharable data.

8. The method according to claim 5 wherein said third master is said second master such that said step g) comprises storing said first master address and said first index in a previous master storage location of said second master.

9. A method for maintaining cache coherence in a multiprocessor computer system having a potential for duplication of data in a plurality of storage locations identifiable as coherence blocks, said multiprocessor computer system employing doubly-linked lists for identifying a previous master of said data and a next master of said data, wherein a second master address and a second index are stored in a next master storage location of a second master, said method comprising the steps of:

a) issuing from a first master to said second master a first transaction requesting sharable data in a coherence block of said second master, said second master being a repository of known valid data, said first transaction including at least an address of a requested coherence block, a first master address for said first master and a first index which identifies a data storage location within the first master;

b) storing said second master address of said second master and said second index of said second master in a previous master storage location of said first master, thereby to indicate a previous link of said first master; thereafter c) issuing from said second master to said first master a second transaction containing at least a portion of the sharable data and at least said second master address and said second index from the next master storage location of said second master; thereafter d) storing said first master address and said first index in said next master storage location of said second master, thereby to indicate a next link of said second master;

e) storing said second master address and said second index in a next master storage location of said first master, thereby to indicate a next link of said first master; and thereafter f) updating previous master addresses and indexes and next master addresses and indexes in selected linked masters to correct pointers.

10. The method according to claim 9 further including the step of tagging each master as containing valid data upon completion of said updating of addresses and indexes.

11. A method for maintaining cache coherence in a multiprocessor computer system having a potential for duplication of data in a plurality of storage locations identifiable as coherence blocks, said multiprocessor computer system employing doubly-linked lists for identifying a previous master of said data and a next master of said data, said method comprising the steps of:

a) issuing from a first master to a second master a first transaction requesting a purge of sharable data in a coherence block of the first master, said first transaction including a third master address for a third master and a third index which identifies a data storage location within the third master; thereafter b) storing said third master address and third index in a next master storage location of said second master, thereby to indicate a next link of said second master;

c) issuing from said second master to said third master a second transaction, said second transaction containing a second master address and a second index of said second master; thereafter d) issuing from said third mast to said first master a third transaction acknowledging completion of said first transaction; thereafter e) storing said second master address and said second index in a previous master storage location of said third master, thereby to indicate a previous link of said third master; and f) marking said coherence block of said first master as invalid.

12. The method according to claim 11 wherein said third master is said second master such that said step b) comprises storing said second master address and said second index in a next master storage location of said second master and step c) comprises issuing a second transaction from said second master to itself, said second transaction containing a second master address and a second index of said second master.

* * * * *

UNITED STATES PATENT AND TRADEMARK OFFICE
CERTIFICATE OF CORRECTION

PATENT NO.   : 5,197,146
DATED        : March 23, 1993
INVENTOR(S)  : LaFetra

It is certified that error appears in the above-identified patent and that said Letters Patent is hereby corrected as shown below:

Column 9,
Line 33, delete "inducing" and insert therefor -- including --

Column 10,
Line 47, delete "mast" and insert therefor -- master --

Signed and Sealed this

Twenty-eighth Day of January, 2003

JAMES E. ROGAN
*Director of the United States Patent and Trademark Office*